(12) United States Patent
Cheng

(10) Patent No.: US 6,279,193 B1
(45) Date of Patent: Aug. 28, 2001

(54) SECONDARY WIPER TO A WINDSHIELD WIPER

(75) Inventor: Wen Hsiung Cheng, Tainan (TW)

(73) Assignee: Wen Hao Chen, Kaohsiung (TW)

( * ) Notice: Subject to any disclaimer, the term of this patent is extended or adjusted under 35 U.S.C. 154(b) by 0 days.

(21) Appl. No.: 09/501,610

(22) Filed: Feb. 10, 2000

(51) Int. Cl.[7] .................................. B60S 1/28; B60S 1/38
(52) U.S. Cl. ........................................ 15/250.41; 15/250.4
(58) Field of Search ............................... 15/250.4, 250.41, 15/250.44, 250.361, 250.43

(56) References Cited

U.S. PATENT DOCUMENTS

| | | | |
|---|---|---|---|
| 3,939,524 | * | 2/1976 | Knights ............................. 15/250.41 |
| 4,719,661 | * | 1/1988 | Hanselmann ........................ 15/250.4 |
| 5,257,436 | * | 11/1993 | Yang .................................. 15/250.4 |
| 5,699,581 | * | 12/1997 | Heneghan et al. .................. 15/250.4 |

FOREIGN PATENT DOCUMENTS

| | | | | |
|---|---|---|---|---|
| 2700527 | * | 9/1978 | (DE) .................................. 15/250.4 |
| 2356541 | * | 1/1978 | (FR) .................................. 15/250.41 |
| 1419345 | * | 12/1975 | (GB) ................................ 15/250.41 |
| 2038169 | * | 7/1980 | (GB) ................................ 15/250.41 |
| 2124477 | * | 2/1984 | (GB) ................................ 15/250.41 |
| 2132077 | * | 7/1984 | (GB) ................................ 15/250.41 |
| 8001155 | * | 6/1980 | (WO) ................................ 15/250.4 |

* cited by examiner

*Primary Examiner*—Gary K. Graham
(74) *Attorney, Agent, or Firm*—Dougherty & Troxell

(57) ABSTRACT

A secondary wiper to a windshield wiper is provided. The secondary wiper is detachably connected through connectors to an arched arm of the windshield wiper to locate in front of the latter relative to a sweeping direction of the windshield wiper. The secondary wiper includes a hair holder to which multiple lines of hair and a long wiping element are held. When the windshield wiper and the secondary wiper are brought to sweep across a windshield, the multiple lines of hairs on the secondary wiper first sweep granular and/or powdered dust off the windshield, so that such dust would not be brought by the windshield wiper to scrape across and damage the windshield. When the wipers are brought to reversely sweep across the windshield, the long wiping element on the secondary wiper effectively scrape watermarks off the windshield to enhance an overall function of the windshield wiper. A damaged secondary or windshield wiper may be independently replaced with a new one without the need to discard the other good wiper at the same time.

16 Claims, 8 Drawing Sheets

SECONDARY WIPER TO A WINDSHIELD WIPER

FIELD OF THE INVENTION

The present invention relates to a secondary wiper to a windshield wiper, and more particularly to a wiper that is independently formed for detachably connecting to and locating in front of a windshield wiper. In a forward moving path of the windshield wiper over a windshield, hairs on the secondary wiper first sweeps granular and/or powdered dust off the windshield, so that hard dust would not be brought by the following windshield wiper to scrape and damage the windshield. And, in a reverse moving path of the windshield wiper, a long wiping element on the secondary wiper effectively removes watermarks on the windshield.

DESCRIPTION OF THE PRIOR ART

A conventional windshield wiper usually includes only one wiping element made of rubber material. When using such rubber-made wiping element to clean dirt attached to a windshield, such as granular and/or powdered dust, bodies of dead insects, and/or bird soils, the windshield tends to be smeared by such dirt wetted with water. Some of the dirt is considerably hard and tends to damage the windshield when it is brought by the rubber-made wiping element to move across the windshield and scrape both the windshield and the wiping element.

To solve these problems, a windshield wiper including one single piece of wiping element and two stripes of hairs separately located at two sides of the wiping element is developed The two stripes of hairs are designed to remove bird soils, bodies of dead insects and/or dust from the windshield before the wiping element sweeps across the windshield to scrape other remaining dust off the windshield Since the two stripes of hairs are so close to the wiping element that they have only limited effect in sweeping off hard dirt and protecting the windshield and the rubber-made wiping element from being scraped by the hard dirt. Moreover, the two stripes of hairs tend to be caught by and pressed below the wiping element when the windshield wiper sweeps across the windshield, resulting in even worse cleaning effect. And, since the hair stripes and the wiping element are integrated on the same windshield wiper, a damaged hair stripe or a damaged wiping element would necessitate replacement of a whole windshield wiper and that is, of course, not economical and practical.

Another conventional windshield wiper includes a rubber-made wiping element and a stripe of hairs located in front of the wiping element for removing dust from the windshield before the rubber-made wiping element sweeps across the windshield. The stripe of hairs, however, would result in watermarks on the windshield and bring some dust along with it to smear the windshield when the windshield wiper sweeps reversely. It is therefore tried by the inventor to develop a secondary wiper to the windshield wiper to eliminate drawbacks existing in the conventional windshield wipers.

SUMMARY OF THE INVENTION

A primary object of the present invention is to provide a secondary wiper that is detachably connected through connectors to an arched arm of a windshield wiper to locate in front of the latter relative to a sweeping direction of the windshield wiper The secondary wiper includes a hair holder to which multiple lines of hair and a long wiping element are held. When the windshield wiper and the secondary wiper are brought to sweep across a windshield, the multiple lines of hairs on the secondary wiper first sweep granular and/or powdered dust off the windshield, so that such dust would not be brought by the windshield wiper to scrape across and damage the windshield. When the wipers are brought to reversely sweep across the windshield, the long wiping element on the secondary wiper effectively scrape watermarks off the windshield to enhance an overall function of the windshield wiper.

Another object of the present invention is to provide a secondary wiper to a windshield wiper. The secondary wiper has multiple lines of hairs provided on a bottom surface of a hair holder. The lines of hairs have different hair lengths that gradually increase from inner lines closer to the windshield wiper to outer lines, so that the lines of hairs fitly contact with the windshield that has a certain curvature.

A further object of the present invention is to provide a secondary wiper detachably connected to a windshield wiper. A damaged secondary or windshield wiper may be independently replaced with a new one without the need to discard the other good wiper at the same time.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
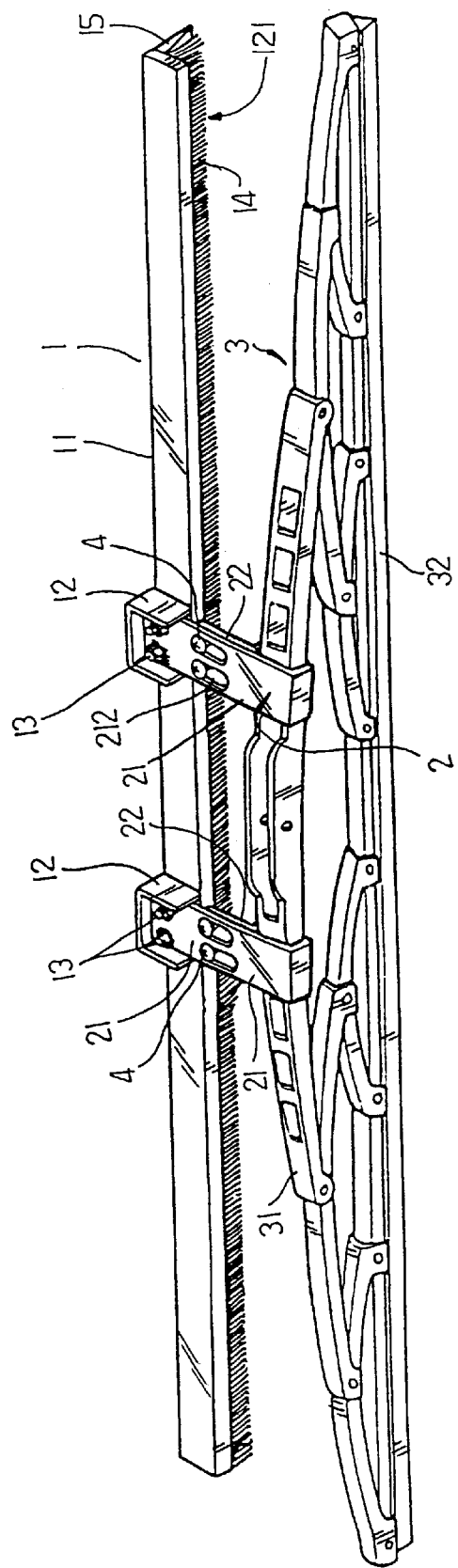
FIG. 1 is an assembled perspective of the present invention according to a first embodiment thereof.
Figure 2:
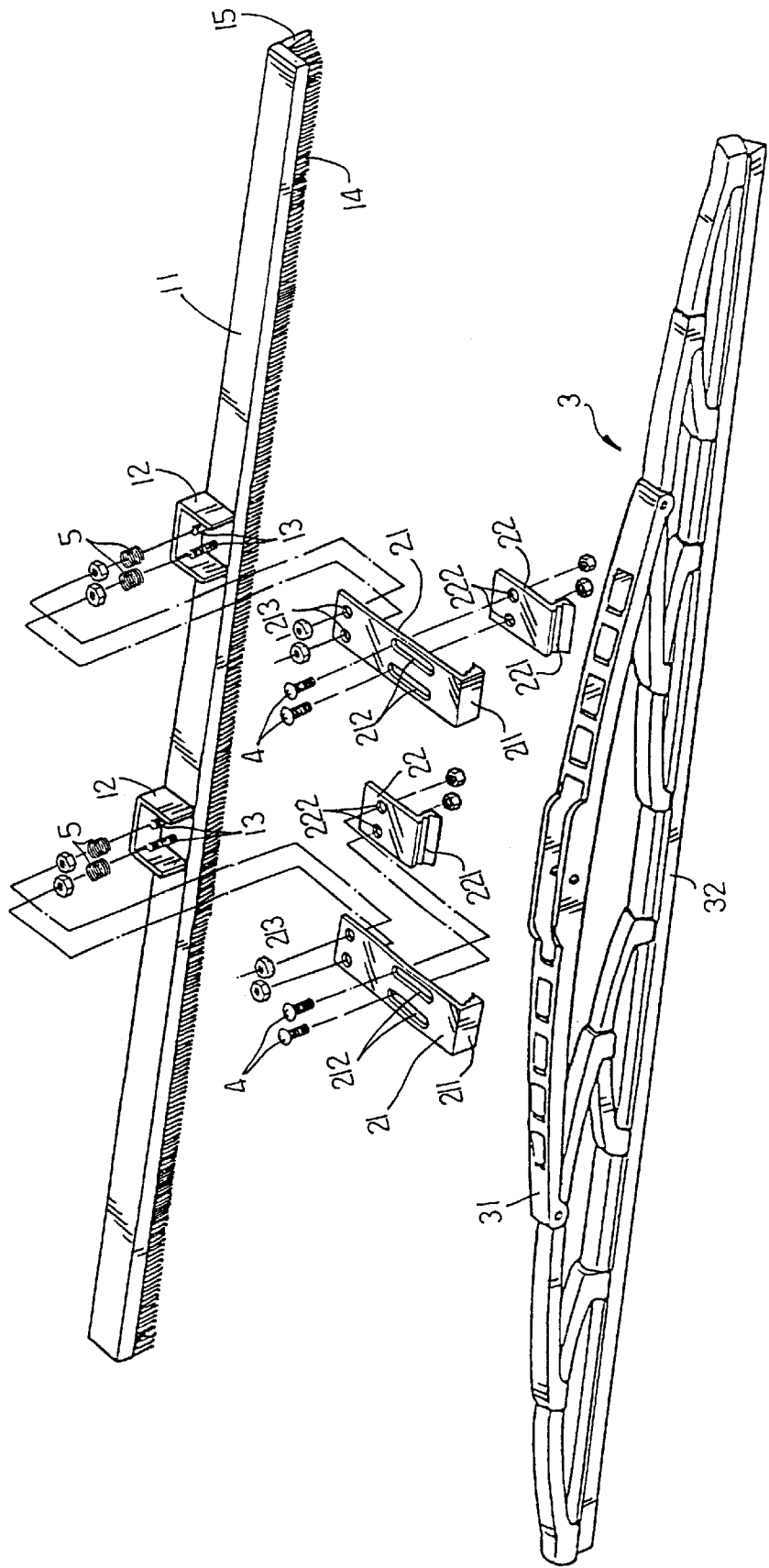
FIG. 2 is an exploded perspective of the first embodiment of the present invention.
Figure 3:
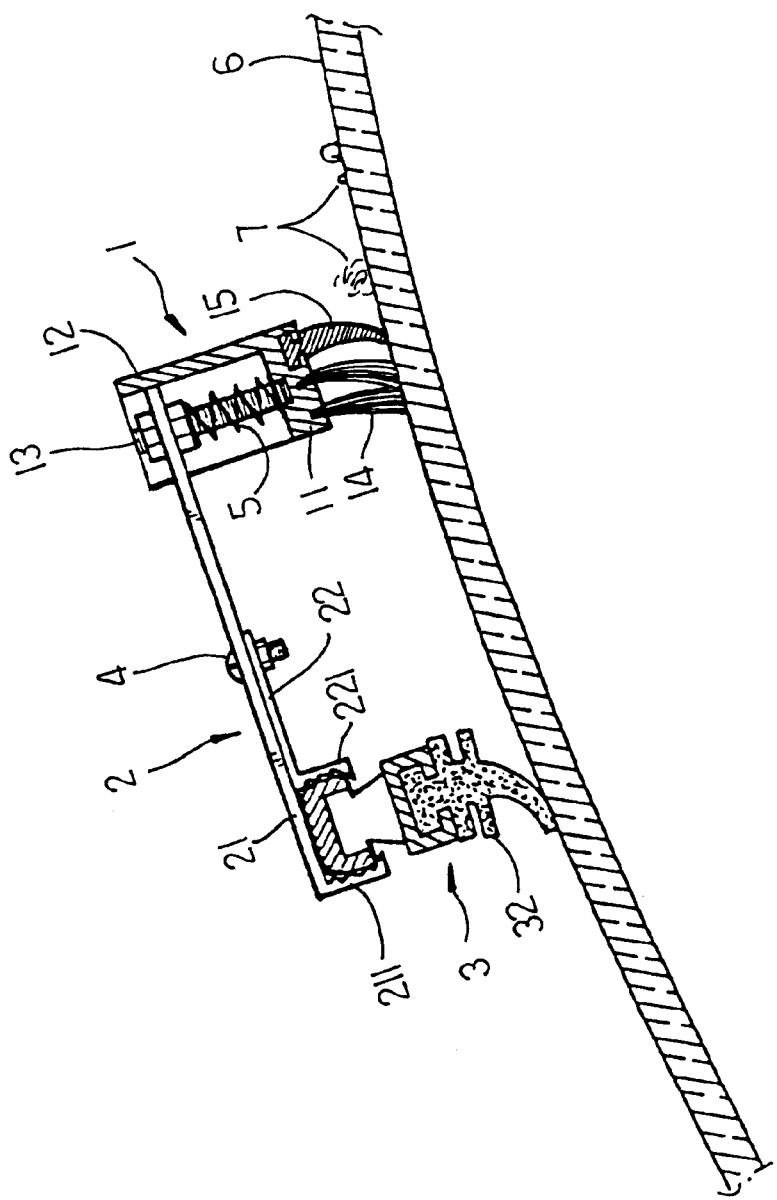
FIG. 3 is a sectional view of the first embodiment of the present invention.

Please refer to FIGS. 1 to 3 in which a secondary wiper 1 to a windshield wiper 3 according to a first embodiment of the present invention is shown. The secondary wiper 1 is connected to the windshield wiper 3 through preferably two connectors 2 that form a part of the present invention, so that the secondary wiper 1 is located in front of the windshield wiper 3 relative to a forward moving path of the windshield wiper 3 with a suitable distance existing between the secondary wiper 1 and the windshield wiper 3.

The secondary wiper 1 includes a hair holder 11, two generally U-shaped walls 12 symmetrically and upward projected from suitable positions at a top surface of the hair holder 11 to define two receiving spaces therein, preferably two fastening elements 13(bolts included) provided in each of the receiving spaces defined by the walls 12, multiple parallel lines of hairs 14 provided at a bottom surface of the hair holder 11 to extend along a longitudinal direction of the hair holder 11, and a long wiping element 15 provided at the bottom surface of the hair holder 11 to locate at outmost side of the hairs 14 relative to the windshield wiper 3. A length of hairs 14 in the multiple lines gradually increases from inner lines to outer lines, so that a surface 121 defined by free ends of the lines of hairs 14 substantially meets a curvature of the windshield 6, allowing all the hairs 14 to sufficiently fitly contact with the windshield 6. The wiping element 15 extends from the bottom surface of the hair holder 11 by a length no less than that of the hairs 14 in the outmost line thereof The connector 2 each includes at least an upper and a lower connecting plate 21 and 22, respectively, that have a predetermined width. The upper connecting plate 21 has a downward and inward bent inner end 211 facing toward the windshield wiper 3 and is provided at middle area with preferably two long slots 212 and near an outer end opposite to the inner end 211 with preferably two locating holes 213 corresponding to the fastening elements 13 on the hair holder 11. The lower connecting plate 22 has a downward and outward bent inner end 221 facing toward the windshield wiper 3 and is provided with preferably two fastening holes 222 corresponding to the long slots 212 on the upper connecting plate 21. When the upper and the lower connecting plates 21, 22 are screwed together by fastening elements 13 down through the long slots 212 and the fastening holes 222, a holding space is defined between the bent inner end 211 and the bent inner end 221 for holding an arched arm 31 of the windshield wiper 3 therein. The long slots 212 allow suitable adjustments of the lower connecting plate 22 relative to the upper connecting plate 21 to provide a holding space that meets and therefore firmly holds to it the arched arm 31 of windshield wiper 3 of different specification.

The outer end of the upper connecting plate 21 is connected to the hair holder 11 by engaging the locating holes 213 with the fastening elements 13 and screwing nuts or the like onto the fastening elements 13. An elastic element 5 is disposed around each fastening element 13 between the upper connecting plate 21 and the hair holder 11, so that the outer end of the upper connecting plate 21 could be height-adjustably fixed on the locating elements 13 to match with an overall height of the windshield wiper 3 relative to the windshield 6 and the hairs 14 and the wiping element 15 on the hair holder 11 could be fitly pressed against the windshield 6. By this way, the secondary wiper 1 of the present invention could be used with windshield wipers 3 of different specifications and is therefore more economical and practical for use.

When the windshield wiper 3 and the secondary wiper 1 are brought to move forward from a beginning position to sweep across the windshield 6, the multiple lines of hairs 14 of the secondary wiper 1, that is located in front of the windshield wiper 3, would first contact with and sweep granular or powdered dust 7 off the windshield 6 while a wiping element 32 on the windshield wiper 3 follows to scrape ink or other even finer dirt off the windshield 6, producing excellent cleaning effect on the windshield 6 and protecting the windshield 6 and the wiping element 32 from being damaged by hard dust, either granular or powdered. The wiping element 15 at the most front of the secondary wiper 1 is useful in scraping watermarks off the windshield 6 when the windshield wiper 3 and the secondary wiper 1 are brought to sweep in a reverse direction toward the beginning position and therefore makes up the insufficient ability of the windshield wiper 3 to fully remove water from the windshield 6.

The provision of the secondary wiper 1 enables the windshield wiper 3 to locate above the windshield 6 with a suitable clearance between the wiping element 32 and the windshield 6, protecting the wiping element 32 from easily cracking and shortened useable life due to constant contact with heated windshield under strong sunshine. Moreover, since the secondary wiper 1 is separable from the windshield wiper 3, a damaged wiper 1 or wiper 3 could be independently replaced with a new one without the necessity of discarding both the secondary wiper 1 and the windshield wiper 3 and without the possibility of adversely affecting an overall cleaning effect of the other wiper 1 or 3.

Figure 4:
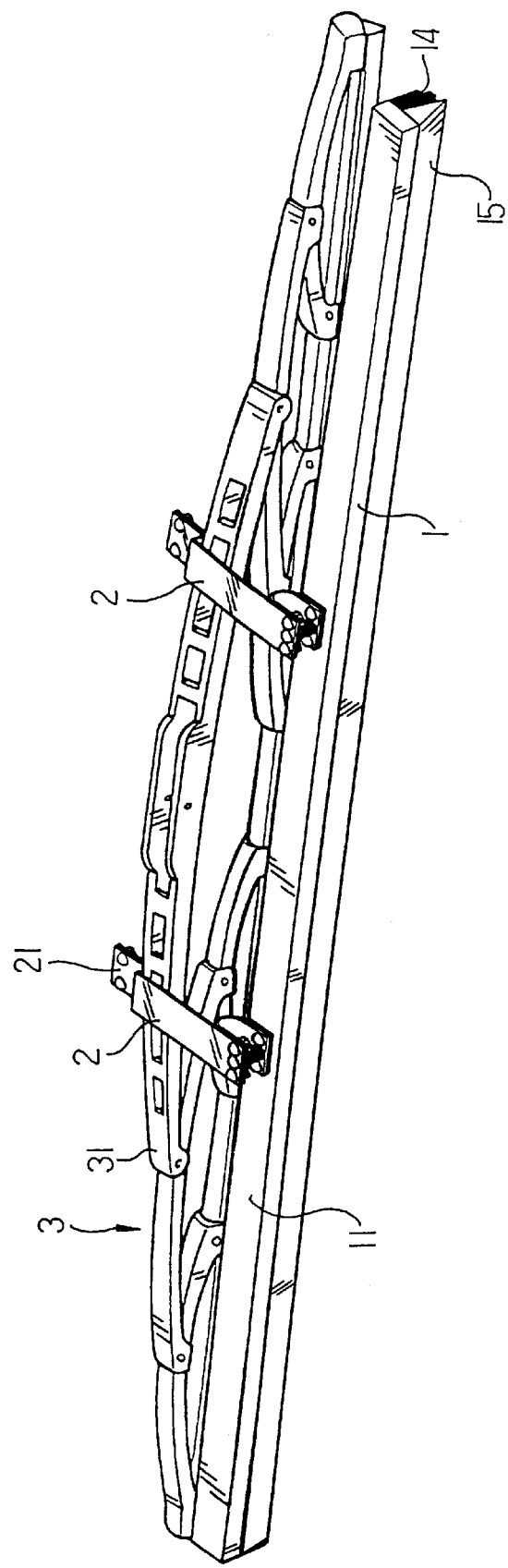
FIG. 4 is an assembled perspective of the present invention according to a second embodiment thereof.
Figure 5:
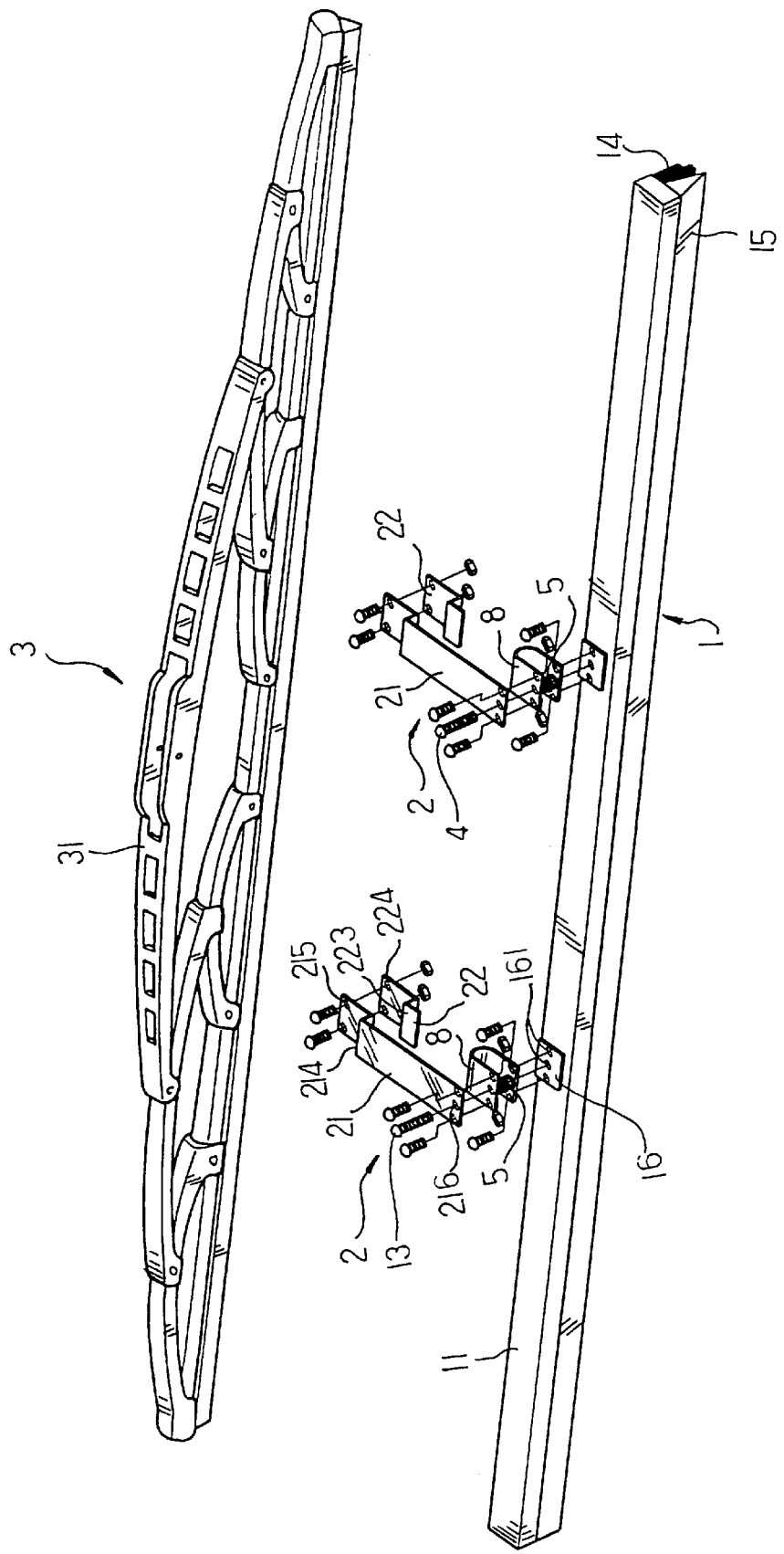
FIG. 5 is an exploded perspective of the second embodiment of the present invention.
Figure 6:
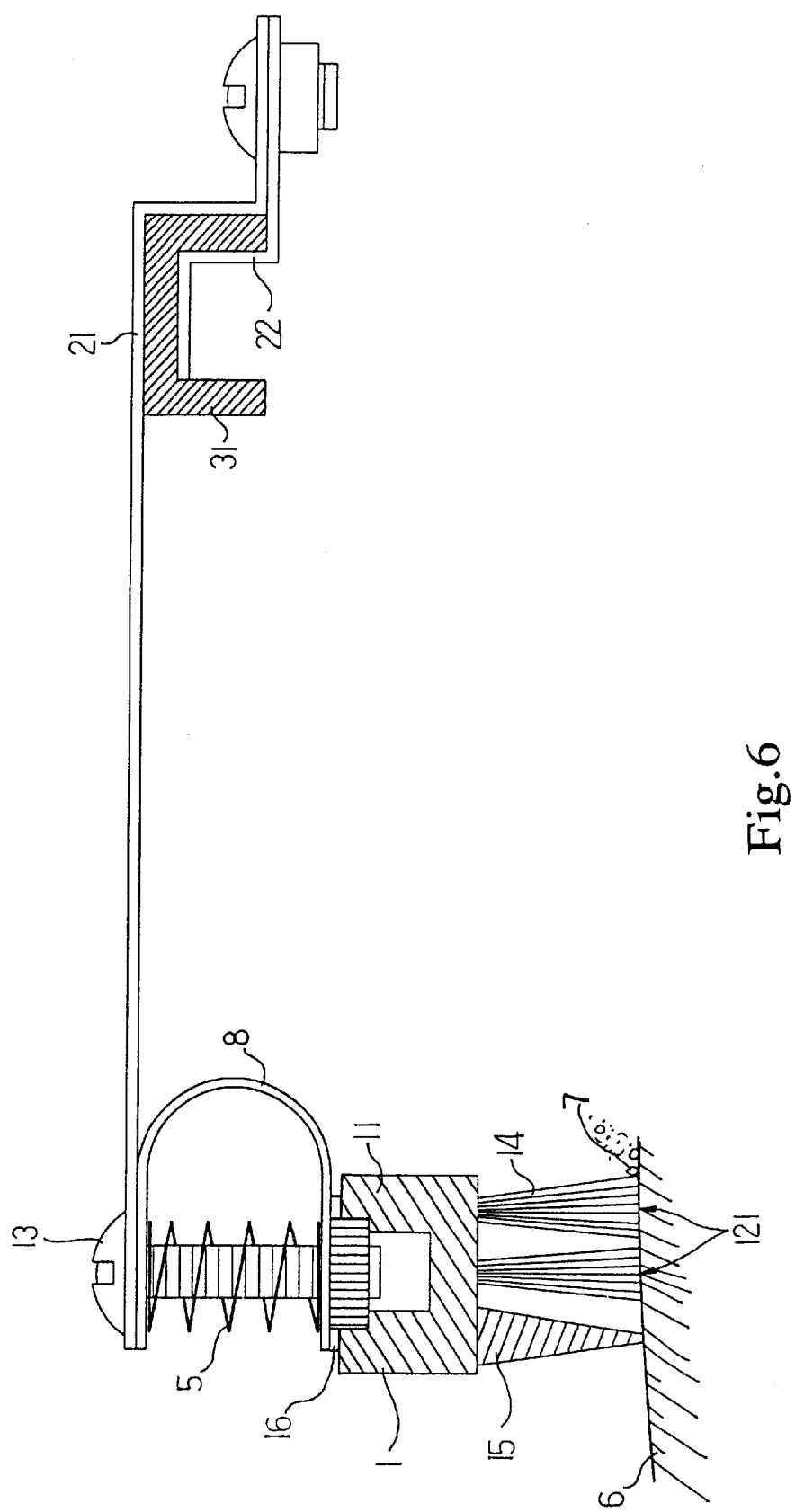
FIG. 6 is an enlarged sectional view of the second embodiment of the present invention.

FIGS. 4 to 6 illustrate a secondary wiper 1 to a windshield wiper 3 according to a second embodiment of the present invention. In this embodiment, same reference numerals will be used to denote elements that are similar to that in the first embodiment. The secondary wiper 1 is connected to the windshield wiper 3 through preferably two connectors 2 that form a part of the present invention, so that the secondary wiper 1 is located in front of the windshield wiper 3 relative to a forward moving path of the windshield wiper 3 with a suitable distance existing between the secondary wiper 1 and the windshield wiper 3.

The secondary wiper 1 includes a hair holder 11, two locating blocks 16 symmetrically provided at suitable positions on a top surface of the hair holder 11 to raise therefrom by an adequate height and each having threaded holes 161 provided thereat, multiple parallel lines of hairs 14 provided at a bottom surface of the hair holder 11 to extend along a longitudinal direction of the hair holder 11, and a long wiping element 15 provided at the bottom surface of the hair holder 11 to locate at outmost side of the hairs 14 relative to the windshield wiper 3. A length of hairs 14 in the multiple lines gradually increases from inner lines to outer lines to substantially meet a curvature of the windshield 6, so that all the hairs 14 could sufficiently fitly contact with the windshield 6. The wiping element 15 extends from the bottom surface of the hair holder 11 by a length no less than that of the hairs 14 in the outmost line thereof The connector 2 each includes at least an upper and a lower connecting plate 21 and 22, respectively, that have a predetermined width. The upper connecting plate 21 has a downward and outward bent inner end 214 facing toward the windshield wiper 3 and being provided with fastening holes 215 and an outer end opposite to the inner end 214 and being provided with suitable number of locating holes 216 corresponding to the threaded holes 161 on the hair holder 11. The lower connecting plate 22 has an upward and outward bent outer end 223 facing toward the secondary wiper 1 and is provided at an inner end opposite to the bent outer end 23 with fastening holes 224 corresponding to the fastening holes 215 on the upper connecting plate 21. By extending the bent outer end 223 of the lower connecting plate 22 below a lower surface of an arched arm 31 of the windshield wiper 3, covering the bent inner end 214 of the upper connecting plate 21 on an upper surface of the arched arm 31 corresponding to the lower connecting plate 22, and connecting the upper and the lower connecting plates 21, 22 together by fastening elements 13 down through the fastening holes 215 and 224, the arched arm 31 of the windshield wiper 3 is firmly held between the bent inner end 214 and the bent outer end 223 of the upper and the lower connecting plates 21, 22, respectively.

The outer end of the upper connecting plate 21 is connected to the hair holder 11 by engaging the locating holes 216 with the threaded holes 161 on the locating block 16 and fastening elements 13 or the like through these holes 216, 161. An elastic element 5 and a generally U-shaped elastic member 8 are disposed between the outer end of the upper connecting plate 21 and the locating block 16, so that the outer end of the upper connecting plate 21 could be height-adjustably fixed on the locating block 16 to match with an overall height of the windshield wiper 3 relative to the windshield 6 and the hairs 14 and the wiping element 15 on the hair holder 11 could be fitly pressed against the windshield 6. By this way, the secondary wiper 1 of the present invention could be used with windshield wipers 3 of different specifications and is therefore more economical and practical for use.

When the windshield wiper 3 and the secondary wiper 1 are brought to move forward from a beginning position to sweep across the windshield 6 that has an outward curved surface, the multiple lines of hairs 14 of the secondary wiper 1, that is located in front of the windshield wiper 3, would first contact with and sweep granular or powdered dust 7 off the windshield 6 while a wiping element 32 on the windshield wiper 3 follows to scrape ink or other even finer dirt off the windshield 6, producing excellent cleaning effect on the windshield 6 and protecting the windshield 6 and the wiping element 32 from being damaged by hard dust, either granular or powdered. The wiping element 15 at the most front of the secondary wiper 1 is useful in scraping watermarks off the windshield 6 when the windshield wiper 3 and the secondary wiper 1 are brought to sweep in a reverse direction toward the beginning position and therefore makes up the insufficient ability of the windshield wiper 3 to fully remove water from the windshield 6.

The provision of the secondary wiper 1 enables the windshield wiper 3 to locate above the windshield 6 with a suitable clearance between the wiping element 32 and the windshield 6, protecting the wiping element 32 from easily cracking and shortened useable life due to constant contact with heated windshield under strong sunshine. Moreover, since the secondary wiper 1 is separable from the windshield wiper 3, a damaged wiper 1 or wiper 3 could be independently replaced with a new one without the necessity of discarding both the secondary wiper 1 and the windshield wiper 3 and without the possibility of adversely affecting an overall cleaning effect of the other wiper 1 or 3.

Figure 7:
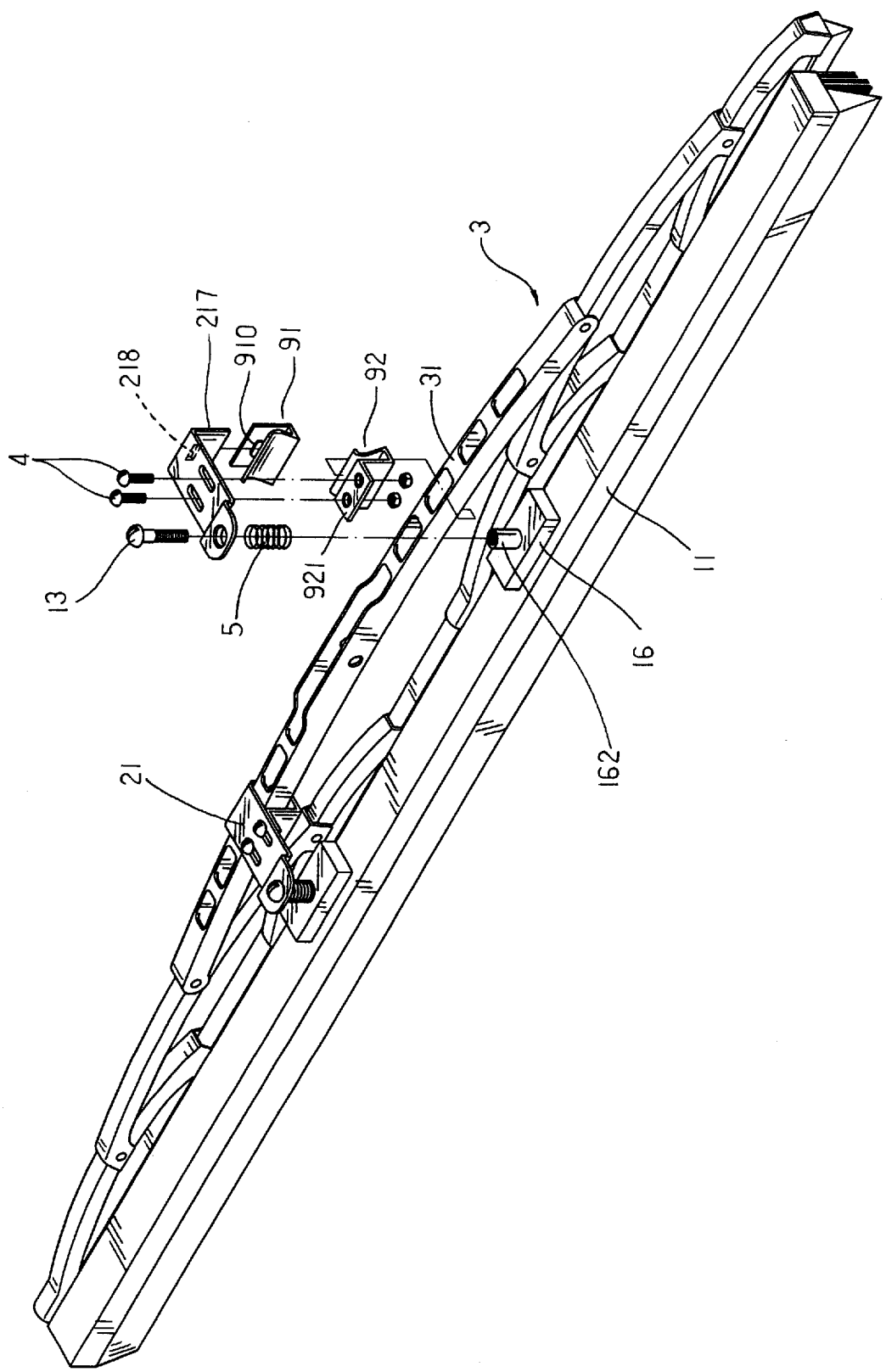
FIG. 7 is a partially exploded perspective of a third embodiment of the present invention.
Figure 8:
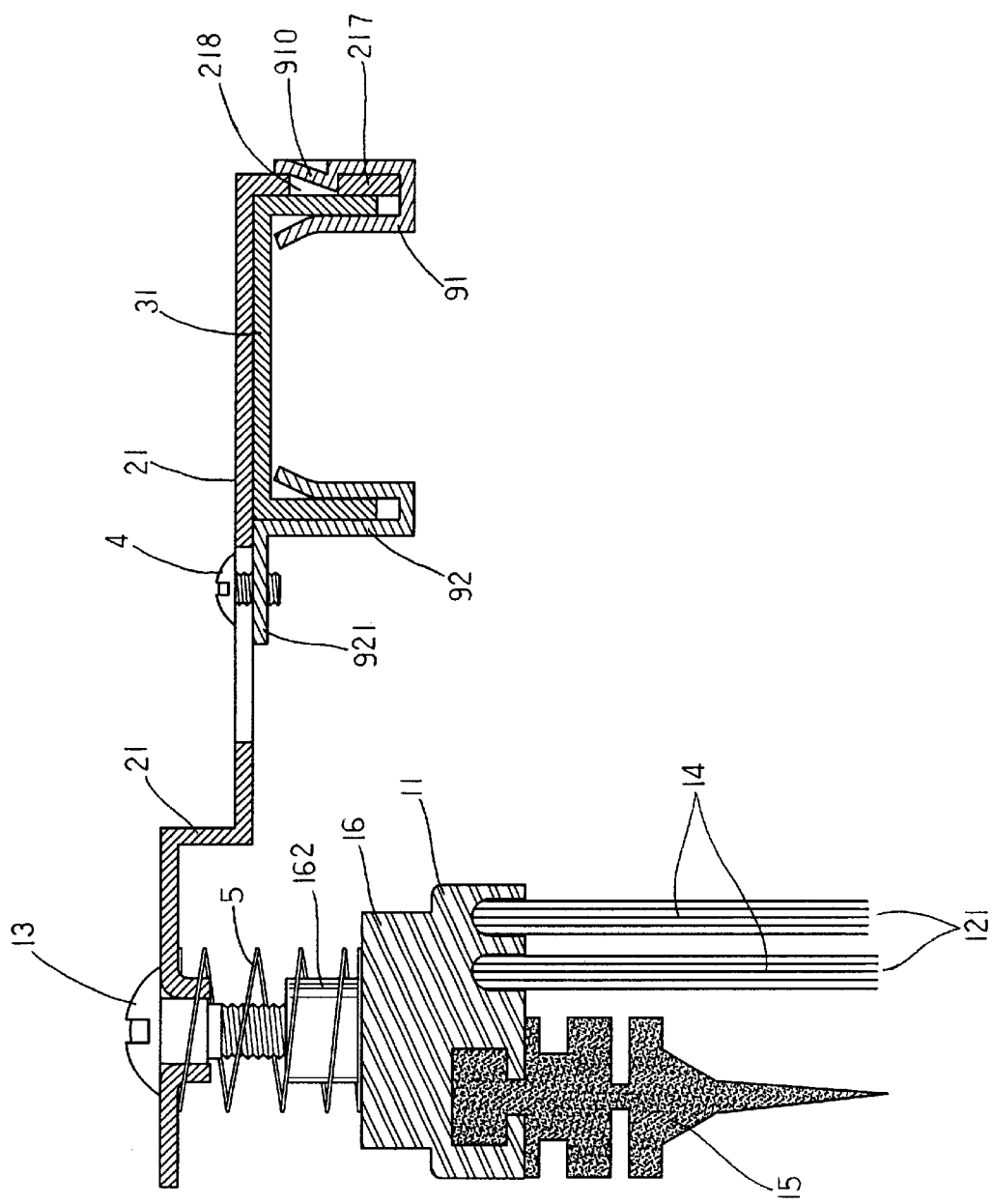
FIG. 8 is an enlarged sectional view of the third embodiment of the present invention.

FIGS. 7 and 8 illustrate a secondary wiper 1 to a windshield wiper 3 according to a third embodiment of the present invention. In this embodiment, same reference numerals will be used to denote elements that are similar to that in the first and the second embodiments. The secondary wiper 1 is connected to the windshield wiper 3 through preferably two connectors 2 that form a part of the present invention, so that the secondary wiper 1 is located in front of the windshield wiper 3 relative to a forward moving path of the windshield wiper 3 with a suitable distance existing between the secondary wiper 1 and the windshield wiper 3. Since the secondary wiper 1 in this third embodiment has a hair holder 11 structurally similar to that of the first and the second embodiments with only a small change in the locating blocks 16, only the locating blocks 16 and the connectors 2 will be described hereinafter.

In the third embodiment of the present invention, the locating block 16 each has an internally threaded locating bar 162 upward projected from the locating block 16. The connector 2 each includes an upper connecting plate 21 and generally U-shaped first and second clips 91, 92. The upper connecting plate 21 is provided at an outer end facing toward the secondary wiper 1 with a locating hole for the locating bar 162 to extend therethrough and at middle area with elongated connecting holes. A fastening element 13 is screwed into the internally threaded locating bar 162 to connect the upper connecting plate 21 to the locating block 16 of the hair holder 11. An elastic element 5 is disposed around the locating bar 162 and the fastening element 13 between the outer end of the upper connecting plate 21 and the locating block 16, so that the secondary wiper 1 could elastically resist a downward pressure against it. An inner end of the upper connecting plate 21 facing toward the windshield wiper 3 bends downward to provide an end plate 217 on which a retaining hole 218 is provided. The first clip 91 is formed at one side thereof with an inward retaining projection 910 corresponding to the retaining hole 218 on the end plate 217 of the upper connecting plate 21. The second clip 92 has a top plate 921 horizontally and outward extended from a top of one side thereof and having connecting holes provided thereon. By covering the upper connecting plate 21 on an arched arm 31 of the windshield wiper 3 corresponding to the locating block 16, the end plate 217 of the upper connecting plate 21 would abut on an inner wall of the arched arm 31 facing toward the windshield 6 and the outer end of the upper connecting plate 21 could be screwed to the locating bar 162 of the locating block 16 on the hair holder 11. The end plate 217 and the inner wall of the arched arm 31 are firmly clamped together by the first clip 91 with the retaining projection 910 extending into the retaining hole 218 on the end plate 217. Meanwhile, the second clip 92 is used to clip an outer wall of the arched arm 31 opposite to the inner wall thereof. Fastening elements 13 are screwed through the elongated connecting holes on the upper connecting plate 21 and the connecting holes on the top plate of the second clip 92 to firmly hold the second clip 92 and accordingly the arched arm 31 to the secondary wiper 1 via the upper connecting plate 21.

It is to be noted the present invention is described in an illustrative and exemplified manner based on the preferred embodiments thereof Many modifications and variations of the present invention are possible in light of the above teachings. Therefore, it is to be understood that within the scope of the appended claims, the invention may be practiced otherwise than as specifically described.

What is claimed is:

1. A windshield wiper assembly comprising a secondary wiper and a windshield wiper, two connectors connecting said secondary wiper to the windshield wiper, such that said secondary wiper is located in front of said windshield wiper relative to a forward moving path of said wiper assembly with a distance existing between said secondary wiper and said windshield wiper;

said secondary wiper including a hair holder, multiple parallel lines of hairs provided on a bottom surface of said hair holder extending along a longitudinal direction of said hair holder, and an elongated wiping element provided on the bottom surface of said hair holder and located such that said multiple lines of hairs are between said windshield wiper and said wiping element; and each of said connectors having an inner end connected to an arched arm of said windshield wiper and an outer end connected to said hair holder of said secondary wiper, such that said multiple lines of hairs have free ends in contact with an outward curved surface of a windshield at a predetermined pressure.

2. The windshield wiper assembly as claimed in claim 1, wherein each of said connectors includes at least an upper and a lower connecting plate having a predetermined width, said upper and said lower connecting plates having a bent inner end facing toward said windshield wiper, such that when said upper and said lower connecting plates of one said connectors are connected to each other, a space is defined between said bent inner ends of said upper and said lower connecting plates for holding an arched arm of said windshield wiper therein.

3. The windshield wiper assembly as claimed in claim 2, wherein said multiple lines of hairs provided at said bottom surface of said hair holder have different hair lengths that gradually increase from inner lines closest to said windshield wiper to outer lines furtherest from said windshield wiper.

4. The windshield wiper assembly as claimed in claim 2, wherein said hair holder has a top surface with predetermined number of locating elements.

5. The windshield wiper assembly as claimed in claim 4, wherein said upper connecting plate of said connector has an outer end provided with locating holes corresponding to and engaging with said locating elements on said hair holder, each of said locating elements having an elastic element disposed therearound between said upper connecting plate and said hair holder.

6. The windshield wiper assembly as claimed in claim 1, wherein said multiple lines of hairs provided at said bottom surface of said hair holder have different hair lengths that gradually increase from inner lines closest to said windshield wiper to outer lines furtherest from said windshield wiper.

7. The windshield wiper assembly as claimed in claim 1, wherein said hair holder has a top surface with predetermined number of locating elements.

8. The windshield wiper assembly as claimed in claim 7, wherein each of said connectors has an outer end provided with locating holes corresponding to and engaging with said locating elements on said hair holder, each of said locating elements having an elastic element disposed therearound between said connecting plate and said hair holder.

9. The windshield wiper assembly as claimed in claim 1, wherein said hair holder has a top surface with a predetermined number of locating blocks that raise from said top surface of said hair holder and are provided with internally threaded locating holes.

10. The windshield wiper assembly as claimed in claim 9, wherein an outer end of each of said connectors and said top surface of said hair holder have a substantially U-shaped elastic element disposed therebetween.

11. The windshield wiper assembly as claimed in claim 10, wherein said outer end of said connector has locating holes corresponding to said threaded locating holes on said locating blocks and connecting holes provided on said U-shaped elastic element, so that locating elements are screwed through said locating holes on said connector, said connecting holes on said U-shaped elastic element, and said threaded locating holes on said locating block to elastically connect said connector to said hair holder, and a further elastic element being disposed around one of said locating elements to allow adjustment of a height of said connector relative to said windshield wiper.

12. A windshield wiper assembly comprising a secondary wiper and a windshield wiper, two connectors connecting said secondary wiper to the windshield wiper, such that said secondary wiper is located in front of said windshield wiper relative to a windshield with a distance existing between said secondary wiper and said windshield wiper;

said secondary wiper including a hair holder, multiple parallel lines of hairs provided on a bottom surface of said hair holder extending along a longitudinal direction of said hair holder, and an elongated wiping element provided on the bottom surface of said hair holder and located such that said multiple lines of hairs are between said windshield wiper and said wiping element; and each of said connectors including at least an upper connecting plate and generally U-shaped first and second clips; said upper connecting plate having an outer end connected to said hair holder of said secondary wiper and a downwardly bent inner end facing toward said windshield wiper forming an end plate abutting an inner wall of an arched arm of said windshield wiper; said first clip firmly clamping said end plate and said inner wall of said arched arm of said windshield wiper together; said second clip firmly clamping an outer wall of said arched arm of said windshield wiper and having a top plate horizontally and outwardly extending from one side thereof to abut on and screw to a bottom side of said upper connecting plate, such that said hair holder is supported by said connectors and located in front of said windshield wiper with said multiple lines of hairs pressing their free ends against the windshield at a predetermined pressure.

13. The windshield wiper assembly as claimed in claim 12, wherein said multiple lines of hairs have different hair lengths that gradually increase from inner lines closest to said windshield wiper to outer lines furtherest from said windshield wiper.

14. The windshield wiper assembly as claimed in claim 12, wherein said hair holder has two locating blocks on a top surface thereof, each of said locating blocks having an internally threaded locating bar projecting upwardly therefrom, said outer end of each of said upper connecting plates being connected to one of said locating blocks by screwing a locating element through a locating hole on said outer end of said upper connecting plate and into said internally threaded locating bar.

15. The windshield wiper assembly as claimed in claim 14, wherein said locating bar and said locating element have an elastic element disposed around them between said outer end of said upper connecting plate and said locating block.

16. The windshield wiper assembly as claimed in claim 12, wherein said end plate of said upper connecting plate has a retaining hole, and said first clip has an inward retaining projection corresponding to said retaining hole.

\* \* \* \* \*